(12) United States Patent
Perteet et al.

(10) Patent No.: US 10,822,941 B2
(45) Date of Patent: Nov. 3, 2020

(54) UNDERGROUND GUIDANCE USING ABOVE-GROUND MESH NETWORK

(71) Applicant: The Charles Machine Works, Inc., Perry, OK (US)

(72) Inventors: Brent W. Perteet, Stillwater, OK (US); Scott B. Cole, Edmond, OK (US); Brian K. Bailey, Stillwater, OK (US); Brian J. Schrock, Flushear, TX (US)

(73) Assignee: The Charles Machine Works, Inc., Perry, OK (US)

( * ) Notice: Subject to any disclaimer, the term of this patent is extended or adjusted under 35 U.S.C. 154(b) by 877 days.

(21) Appl. No.: 15/216,218

(22) Filed: Jul. 21, 2016

(65) Prior Publication Data

US 2017/0022799 A1    Jan. 26, 2017

Related U.S. Application Data

(60) Provisional application No. 62/245,521, filed on Oct. 23, 2015, provisional application No. 62/195,018, filed on Jul. 21, 2015.

(51) Int. Cl.
*E21B 47/0232* (2012.01)
*E21B 47/09* (2012.01)
*E21B 47/024* (2006.01)
*G01V 3/15* (2006.01)

(52) U.S. Cl.
CPC ........ *E21B 47/0232* (2020.05); *E21B 47/024* (2013.01); *E21B 47/09* (2013.01); *G01V 3/15* (2013.01)

(58) Field of Classification Search
CPC ........ E21B 47/024; E21B 7/046; E21B 47/09; E21B 7/04; E21B 47/02224; E21B 47/0232; G01V 3/15; G01V 3/26; G01V 3/081; G01V 3/08; G01R 33/0206
See application file for complete search history.

(56) References Cited

U.S. PATENT DOCUMENTS

| | | |
|---|---|---|
| 6,005,532 A | 12/1999 | Ng |
| 6,035,951 A | 3/2000 | Mercer et al. |
| 6,047,783 A | 4/2000 | Mercer et al. |
| 6,095,260 A | 8/2000 | Mercer et al. |
| 6,250,402 B1 | 6/2001 | Brune et al. |
| 6,364,035 B2 | 4/2002 | Brune et al. |
| 6,454,023 B1 | 9/2002 | Mercer et al. |
| 6,457,537 B1 | 10/2002 | Mercer et al. |
| 6,536,538 B2 | 5/2003 | Brune et al. |
| 6,640,907 B2 | 11/2003 | Mercer et al. |

(Continued)

OTHER PUBLICATIONS

Digi "Digi XBee S2C Digimesh 2.4", Product Datasheet, Printed Nov. 22, 2016, 3 pages, from www.digi.com website, Minnetonka, MN.

*Primary Examiner* — Yong-Suk Ro
(74) *Attorney, Agent, or Firm* — Tomlinson McKinstry, P.C.

(57) ABSTRACT

A tracking system for communicating a location of a beacon in order to drill a bore path. The beacon is carried by a drill string in a drilling operation. Above-ground trackers are arranged in a path to define an intended underground bore path. The trackers form a multi-node mesh network in communication with a display unit at a drilling rig. A drilling operator guides the drill string in response to tracking data sent from the tracking system.

17 Claims, 5 Drawing Sheets

(56) References Cited

U.S. PATENT DOCUMENTS

| | | |
|---|---|---|
| 6,668,944 B2 | 12/2003 | Brune et al. |
| 6,727,704 B2 | 4/2004 | Brune et al. |
| 6,856,135 B2 | 2/2005 | Brune et al. |
| 6,917,202 B2 | 7/2005 | Brune et al. |
| 6,920,943 B2 | 7/2005 | Mercer et al. |
| 6,975,119 B2 | 12/2005 | Brune et al. |
| 7,021,403 B2 | 4/2006 | Brune et al. |
| 7,080,698 B2 | 7/2006 | Mercer et al. |
| 7,084,636 B2 | 8/2006 | Brune et al. |
| 7,218,116 B2 | 5/2007 | Brune et al. |
| 7,159,672 B2 | 7/2007 | Mercer et al. |
| 7,347,280 B2 | 3/2008 | Brune et al. |
| 7,403,013 B2 | 7/2008 | Brune et al. |
| 7,562,722 B2 | 7/2009 | Brune et al. |
| 8,025,109 B2 | 9/2011 | Brune et al. |
| 8,393,414 B2 | 3/2013 | Brune et al. |
| 8,668,030 B2 | 3/2014 | Brune et al. |
| 2014/0111211 A1* | 4/2014 | Cole ................ G01R 33/0206 324/346 |

* cited by examiner

UNDERGROUND GUIDANCE USING ABOVE-GROUND MESH NETWORK

CROSS REFERENCE TO RELATED APPLICATION

This application claims the benefit of U.S. Provisional Patent Application Ser. No. 62/245,521 filed on Oct. 3, 2015 and U.S. Provisional Patent Application Ser. No. 62/195,018 filed on Jul. 21, 2015, the entire contents of which are incorporated herein by reference.

FIELD

This invention relates generally to horizontal directional drilling tracking systems and methods.

SUMMARY

This invention is directed to a system and method of use for guiding the drilling of a bore path. The system includes a magnetic dipole source and an above-ground tracking system. The tracking system is formed as a multi-node mesh network in communication with the magnetic dipole source. The tracking system includes at least two trackers, which are nodes of the network, and a display unit.

DESCRIPTION OF THE PREFERRED EMBODIMENTS

Horizontal directional drilling is a steerable, trenchless method of installing underground pipes, conduits, and cables using a surface-launched drilling rig. Since horizontal directional drilling is a trenchless method, it results in minimal impact on the surrounding areas and infrastructure. Horizontal directional drilling is particularly useful when trenching or excavating is not practical, such as when it is necessary to drill under existing structures, highways, or bodies of water.

Figure 1:
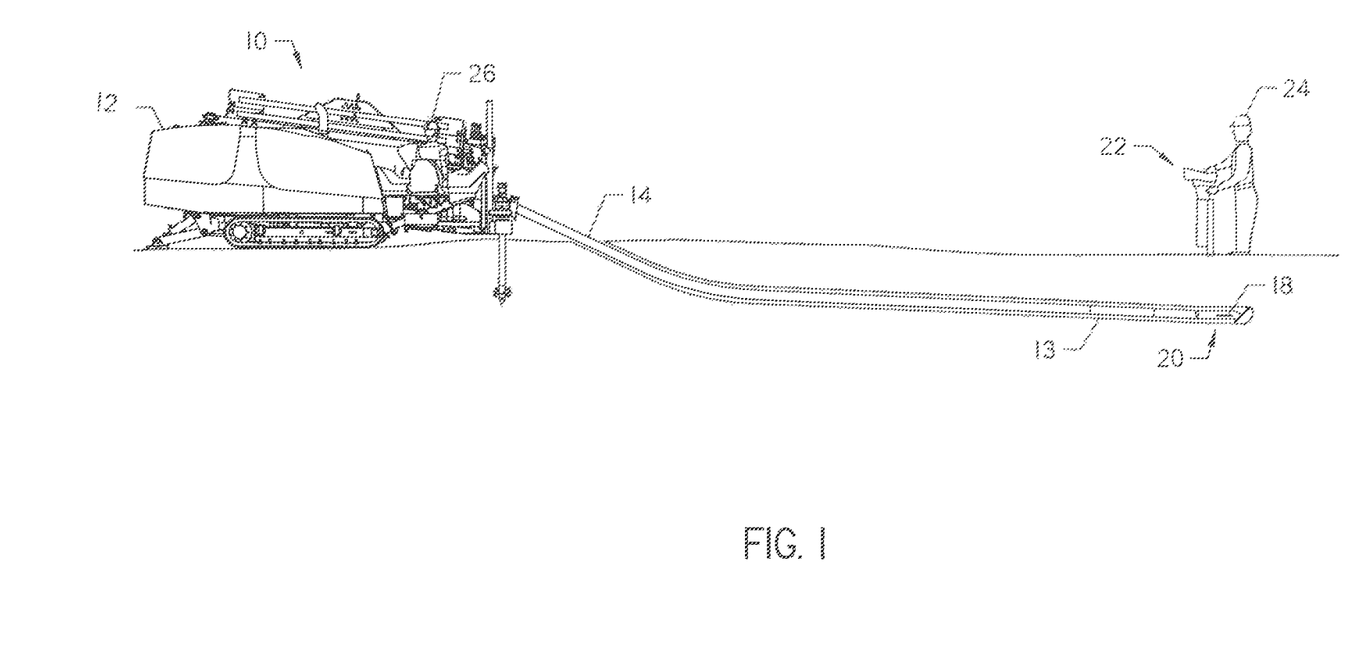
FIG. 1 shows a conventional horizontal directional drilling setup.

Shown in FIG. 1 is a conventional horizontal directional drilling system 10. A drill rig 12 drills a pilot bore 13 by steering a drill string 14 through an area underground. At the front of the drill string 14, a beacon 18 transmits a low frequency dipole magnetic field from a downhole tool 20. An above-ground tracker 22 detects the beacon 18 and guides a tracking operator 24 who walks over the ground above the beacon 18. The tracking operator 24 follows above the beacon 18 and transmits steering information back to a drill operator 26.

A disadvantage of the conventional walkover method of tracking and guiding a beacon 18 is that it requires both the trenching operator 24 and drill operator 26. In many instances, it would be advantageous to track and guide the drilling operation remotely at the drill rig 12, without requiring an operator to follow above the beacon 18.

Figure 2:
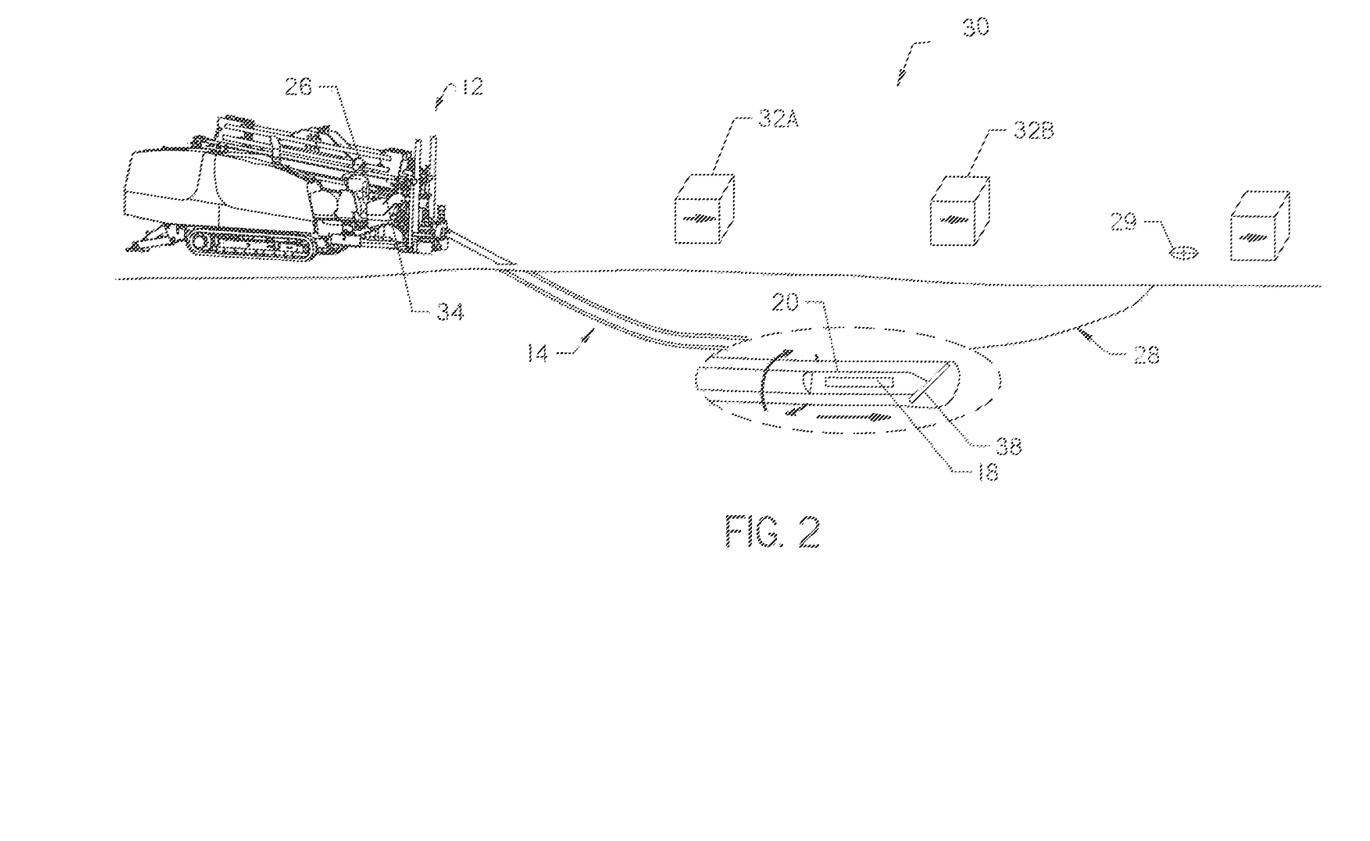
FIG. 2 shows a horizontal directional drilling site where trackers have been arranged along an above-ground path to guide underground boring.

With reference to FIG. 2, the beacon 18 is carried by the drill string 14. The drill string 14 is advanced along a planned bore path 28 towards an exit location 29 and tracked by an above-ground tracking system 30. The tracking system 30 includes a plurality of stationary trackers 32A and 32B that form a part of a multi-node mesh network 50 as will be described with reference to FIG. 3. Tracking data is shown at a display unit 34 located at the drill machine 12 that communicates with the tracking system 30.

The beacon 18 in FIG. 2 may be carried within the downhole tool 20 and may have a steerable drill bit 38. The downhole tool 20 has an internal chamber that holds the beacon 18 in a fixed position relative to the drill bit 38. One end of the downhole tool 20 is threaded for connection onto the drill string 14. Since the position of the beacon 18 is fixed relative to the drill bit 38, sensors in the beacon can be used to detect the boring tool orientation. Additional downhole data, such as temperature, can also be detected by sensors in the beacon 18.

Figure 3:
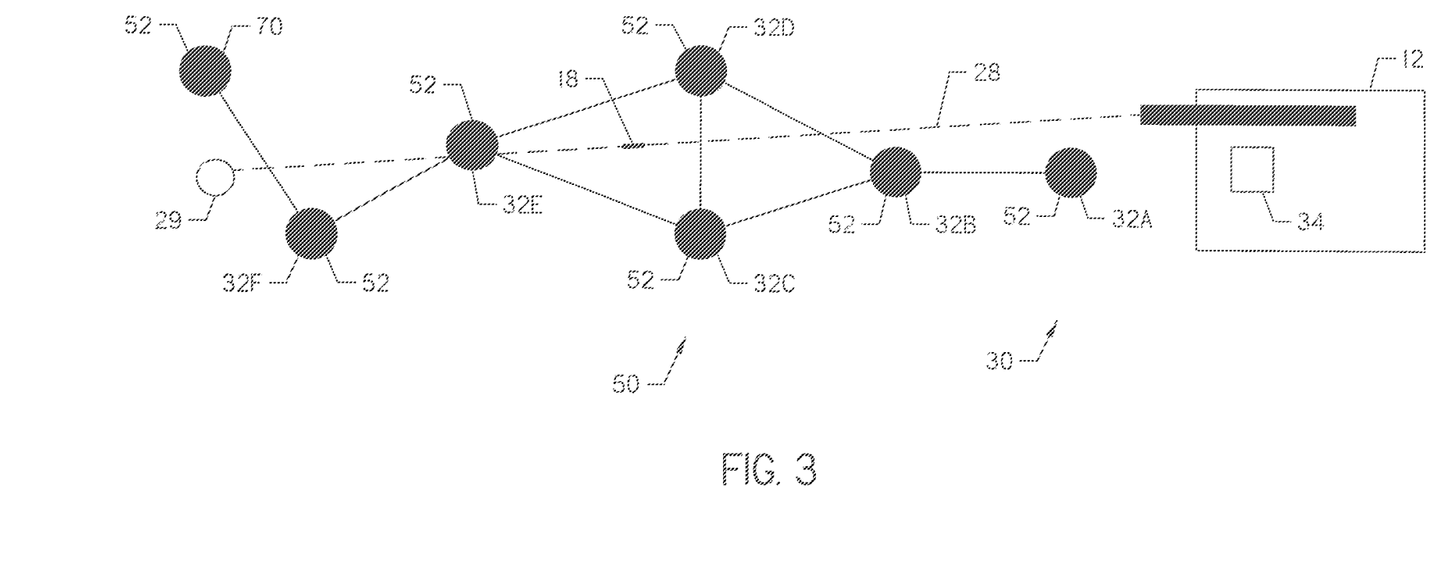
FIG. 3 shows a schematic of a mesh network topology.

With reference to FIG. 3, the tracking system 30 is formed as a mesh network 50, with each tracker 32A-F functioning as a separate node 52. In a mesh network 50, each node 52 can communicate with one or more other nodes in the network.

When nodes 52 of the mesh network 50 are not in direct radio communication with one another, data may be exchanged between them through intermediate nodes in the network. The mesh network 50 can remain functional even as individual nodes 52 appear and disappear. Such events are common-place in underground tracking, due to such factors as radio interference, tracker damage, and powering and depowering of individual trackers 32a-f.

Figure 4:
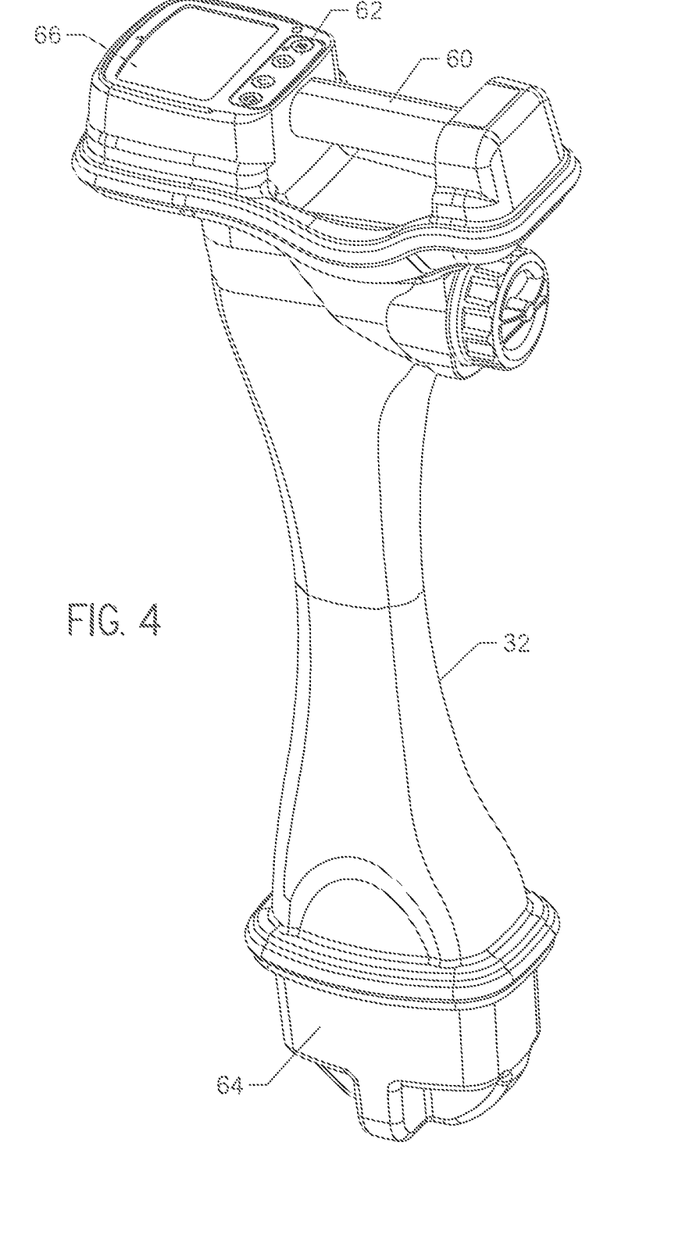
FIG. 4 is an enlarged side view of one of the trackers situated on the horizontal directional drilling site of FIG. 2.

With reference to FIG. 4, the tracker 32 is portable and configured to rest stably on a ground surface. For ease of transport, each tracker 32 is preferably provided with a handle 60.

Each tracker 32A-F comprises a controller 62, such as a computer processor, that receives and processes dipole signal data and directs operation of other components of the tracker. Each tracker further comprises at least one receiving antenna 64, for receiving the dipole signal from the beacon 18. The receiving antenna 64 may be a tri-axial system that measures field components along each of the three orthogonal axes. One such antenna and the methods for calculating beacon 18 location using these antennas are disclosed at length in U.S. Pat. No. 9,329,297 issued to Cole, et al., the contents of which are incorporated herein by reference.

Once received, the dipole signal is digitized and sent to the controller 62. The controller performs any necessary analysis on the digitized dipole signal, and generates original tracking data. That original tracking data may include signal strength, the calculated distance of the dipole source from the tracker, and such information as pitch, roll, temperature, remaining battery life, depth (measured and predicted), distances (horizontal and range), and steering direction. This information may be displayed at a tracker display 66, or may be conveyed to the display 34 of the drilling machine 12 (FIG. 2).

With reference again to FIG. 3, each tracker 32A-F further defines a network broadcast system for receiving tracking data from other nodes 52 of the network 50, and for relaying tracking data to other nodes of the network. Communication between nodes 52 of the network may occur through wires or cables (not shown), but more preferably occurs through a wireless radio link, such as a Bluetooth system.

Each tracker 32A-F is characterized by an active mode and an inactive mode. When a tracker 32A-F is in active mode, the controller 62 (FIG. 4) causes its network broadcast system to transmit its original tracking data to other nodes 52 of the network. When a tracker 32a-f is in inactive mode, no tracking data gathered by its receiving antenna 64 is transmitted by that tracker's broadcast system. Instead, the controller 62 causes the network broadcast system to receive tracking data from adjacent nodes 52. This received tracking data is then relayed to other nodes 52 of the network 50.

One of the trackers 32A-F of the tracking system 30 functions as a server 70 for the network. In addition to the components described above, the server 70 further includes one end of a communication link that relays tracking data broadcast on the network to the display unit 34. Preferably, the communication link is wireless.

When the beacon 18 is used to guide a horizontal directional drilling system, the display unit 34 is preferably located within close visual range of the operator of that system, ordinarily at the drilling rig. With visual access to the display unit 34, the operator can see tracking data broadcast on the network 50, and use that data to steer or otherwise guide the drill string 14 as required. The display unit 34 may include a liquid crystal display panel and input buttons.

Preferably, the controller of the server tracker 70 designates which of the trackers 32A-F within the network 50 is the active tracker, and notifies that tracker as to its active status. In one embodiment, the controller of the server tracker discontinues a tracker's active status in response to a discontinuity in tracking data observed by the then-active tracker. More preferably, active status is ended in response to a discontinuity in field strength reported by the then-active tracker. This lack of field strength may be indicative of the beacon 18 passing out of the area proximate the active tracker.

When active status is ended, the controller 62 of the server tracker 70 causes active status to shift to another tracker 32A-F in the network 50. Preferably, the controller 62 is configured to select the next adjacent tracker along the ground above the bore path for active status.

A tracker 32A-F may optionally be provided with a user interface unit 72 that displays tracking data and other information, and may permit input of programming commands and other user instructions. However, it is contemplated that most of the trackers 32a-f forming the network will not include user interface units. In one embodiment, only one tracker 70, the server tracker, is provided with a user interface.

Trackers 32A-F are arranged in a path on the ground above the intended bore path 28. The trackers 32A-F are then powered on in any order. The order in which a tracker 32a-f is powered on can be used to indicate the tracker's order on the intended bore path 82. When the server tracker 70 is powered on, it periodically broadcasts a signal throughout the network 50 to announce its presence. Other trackers, called client trackers, respond to the server 70 announcement signal. When a client tracker responds, it is registered by the server tracker in a local database.

To compensate for deviations from ideal conditions, including noise, a calibration process is performed. In a system where there are multiple trackers 32A-F, the calibration process would be time consuming and prone to error if each tracker had to be independently calibrated to the beacon. Therefore, the calibration process of the entire system 50 can be performed once between the beacon 18 and a single tracker 32.

Prior to putting the beacon 18 underground, the server tracker 70 is calibrated to the beacon 18. The processor of the server tracker 70 calculates calibration factors specific to the current calibration process. Specifically, the server tracker 70 receives a signal from the beacon 18 and automatically adjusts the frequency of the signal to optimize reception. Calibration factors such as signal strength and signal-to-noise ratio are considered when choosing a calibration frequency. The server tracker then forwards the calibration frequency on to the client trackers. Each tracker's processor adjusts its own stored calibration frequency to match the server 70. Such calibration may take place at an above-ground location near the drill site, as disclosed in U.S. Patent Publication No. 2014-0144704, issued to Cole, et. al. Alternatively, the server tracker 70 and beacon 18 may be calibrated and keyed to one another at an area isolated from electrical interference prior to beginning boring operations.

After calibration, the drill operator begins drilling a bore with a drill string 13 carrying the beacon 18. The server tracker 70 monitors the position of the beacon 18 as measured by the client trackers 32A-F. Preferably, the server 70 is the only tracker 32a-f in the network that forwards tracking information from the beacon 18 to a remote display unit 34. A drill operator uses the tracking information to guide the beacon 18 along the desired bore path until the boring project is complete.

One of the features of the presently disclosed tracking system 30 is that there is no need to calculate the geographical coordinates of any tracker 32A-F in the system. As long as the trackers 32A-F are arrayed above the desired underground bore path 28, the beacon 18 can be guided on that path without any need to ascertain the tracker geographical coordinates.

In the mesh network 50, nodes 52 can be placed in any order and trackers 32A-F can be added to the network at any time. Where a desired bore path is longer than can be defined by the number of trackers 32A-F in use, an operator can reposition one or more of the trackers to continue defining an additional length of the bore path. The trackers can be repositioned as many times as required to complete a boring project.

Figure 5:
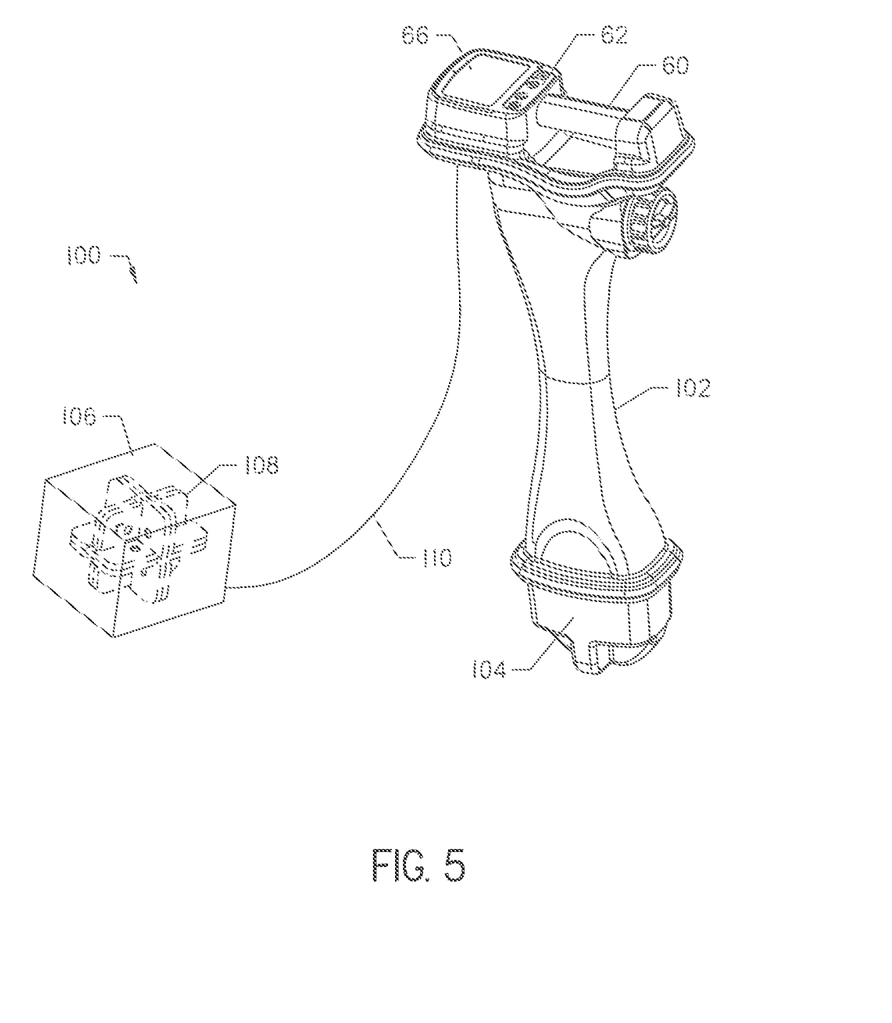
FIG. 5 is a side view of an external antenna system which may be used in the horizontal directional drilling site of FIG. 2.

Shown in FIG. 5 is an external antenna system 100. The external antenna system 100 includes a tracker 102, which has an internal antenna 104. The tracker 102 may have similar components as the tracker 32 of FIG. 4, such as a handle 60, controller 62, etc. However, the external antenna system 100 also includes a second antenna assembly 106 that is located outside of the tracker 102. The second antenna assembly 106 has antenna 108 and a communication link 110 to the tracker. The communication link 110 may be wired or wireless. Preferably, the second antenna assembly 106 is waterproof such that it may be placed in water to maintain signal strength when a beacon 18 is below a body of water. The second antenna 106 may be moved along the body of water as the bore progresses, allowing the second antenna 106 to act as a node 52 (FIG. 3) in what would otherwise be a "blind" boring operation.

The external antenna system 100 can be used as two nodes 52 within the tracking system 30 described in FIG. 2. In one embodiment, the tracker 102 is one node 52 and the second antenna assembly 106 is another node of the same tracking system 30. The advantages of using two or more locations to accomplish a tracking function, and a method for doing so, are found in U.S. Pat. No. 7,952,357 issued to Cole, the contents of which are incorporated herein by reference.

Alternatively, the external antenna 106 may be used with the tracker 102 to create two simultaneous tracking antennas over difficult terrain or when an offset tracking position is desired. The external antenna system 100 may operate as a network 50 having two nodes 52 by placing the second antenna 106 a distance in front of the tracker 102 and "leap frogging" as the bore progresses.

One of skill in the art will appreciate that the disclosed invention herein is illustrative of the claimed features and not intended to limit the scope of the following claims.

What is claimed is:

1. A method, comprising:
providing an underground magnetic dipole source; and
providing an above-ground tracking system in a region overlying the underground magnetic dipole source, the system being formed as a multi-node mesh network;
causing the dipole source to emit a magnetic field;
detecting the magnetic field at one or more nodes of the multi-node mesh network and generating tracking data;
placing each node of the multi-node mesh network in a selected one of an active mode or an inactive mode, wherein:
the active mode is characterized by the transmission of the tracking data by one node to one or more other nodes of the mesh network; and
the inactive mode is characterized by no transmission of the tracking data detected by the node; and
using the tracking data detected by the active mode nodes of the mesh network to direct movement of the magnetic dipole source along an underground path; and
advancing the underground magnetic dipole source;
as the underground magnetic dipole source advances, changing a first node of the mesh network from the active mode to the inactive mode, and changing a next adjacent node of the mesh network along above-ground path from the inactive mode to the active mode.

2. The method of claim 1 further comprising receiving, at a first node, dipole tracking data from the dipole source and from adjacent nodes within the mesh network, and relaying dipole tracking data to an adjacent node within the mesh network.

3. The method of claim 1 further comprising:
storing calibration data characteristic of a first node at the first node; and
receiving and storing calibration data originating from another node within the mesh network at the first node.

4. The method of claim 1 further comprising:
providing, in the mesh network, at least one client node that communicates only with adjacent nodes; and
providing, in the mesh network, one and only one server node that communicates with adjacent client nodes and with a display unit.

5. The method of claim 1 further comprising placing a single node in the active mode, and
limiting dipole tracking data relayed between nodes of the mesh network to that originating from the node then in active status.

6. The method of claim 1 comprising selecting a different node for active mode in response to a discontinuity in the dipole tracking data observed by the node then in active mode.

7. The method of claim 1 in which the transmission of data by nodes of the mesh network in active mode is wireless.

8. The method of claim 1 comprising displaying the tracking data at a display module.

9. The method of claim 1, further comprising:
providing an underground drill string;
providing a directional downhole boring tool attached to the underground drill string, the directional downhole boring tool comprising:
a threaded end for connection to the drill string; and
a steerable drill bit;
wherein the magnetic dipole source is disposed within the directional downhole boring tool.

10. The method of claim 1, further comprising:
after placing the first node in inactive mode, moving the first node to a new and outlying position; and
thereafter, placing the first node in active mode.

11. The method of claim 1 in which the step of placing each node of the multi-node mesh network in an active mode or a passive mode comprises:
observing the tracking data at each node;
determining the existence of a discontinuity in the tracking data; and
placing the nodes at which a discontinuity is detected in inactive mode.

12. A The method of claim 1 further comprising:
arranging a plurality of ground-contacting nodes into a mesh network at an above ground region; and
using tracking data transferred from the selected nodes of the mesh network to a display unit to direct movement of the magnetic dipole source along an underground path.

13. The method of claim 12 in which the underground path underlies the above-ground region.

14. The method of claim 12 in which the nodes of the mesh network are arranged within the above-ground region in order of increasing distance from the display unit.

15. The method of claim 12, further comprising:
extending the above-ground region by disconnecting one of the trackers from the mesh network, and reconnecting that tracker to the network at a new and outlying position.

16. The method of claim 12, further comprising:
repositioning at least one tracker in order to extend the underground path.

17. The method of claim 12, further comprising:
advancing the magnetic dipole source; and
thereafter, changing, the selection of which of the one or more nodes transmit tracking data.

\* \* \* \* \*

UNITED STATES PATENT AND TRADEMARK OFFICE
CERTIFICATE OF CORRECTION

PATENT NO.         : 10,822,941 B2
APPLICATION NO.    : 15/216218
DATED              : November 3, 2020
INVENTOR(S)        : Perteet et al.

It is certified that error appears in the above-identified patent and that said Letters Patent is hereby corrected as shown below:

In the Claims

Column 6 (Line 31), Claim 12, Line 1, please delete "A".

Signed and Sealed this
Twenty-second Day of December, 2020

Andrei Iancu
*Director of the United States Patent and Trademark Office*